(12) United States Patent
Van Wiemeersch (10) Patent No.: US 9,166,730 B2
(45) Date of Patent: Oct. 20, 2015

(54) RF JAMMING DETECTION AND MITIGATION SYSTEM

(71) Applicant: FORD GLOBAL TECHNOLOGIES, LLC, Dearborn, MI (US)

(72) Inventor: John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 83 days.

(21) Appl. No.: 14/037,519

(22) Filed: Sep. 26, 2013

(65) Prior Publication Data

US 2015/0087241 A1    Mar. 26, 2015

(51) Int. Cl.
*H04W 4/00*     (2009.01)
*H04K 3/00*     (2006.01)
*H04L 29/08*    (2006.01)
*H04W 36/12*    (2009.01)
*H04L 29/06*    (2006.01)

(52) U.S. Cl.
CPC .............. *H04K 3/22* (2013.01); *H04L 67/141* (2013.01); *H04W 36/12* (2013.01); *H04L 63/061* (2013.01)

(58) Field of Classification Search
USPC ................. 455/500, 343.2, 41.2, 238.1, 450, 455/404.1, 522, 67.11, 69; 340/426.1, 5.53, 340/435, 436, 461, 426.26, 426.18, 439, 340/5.2, 5.64
See application file for complete search history.

(56) References Cited

U.S. PATENT DOCUMENTS

| | | | |
|---|---|---|---|
| 5,565,870 A * | 10/1996 | Fukuhara et al. | 342/70 |
| 8,175,573 B2 | 5/2012 | D'Avello et al. | |
| 8,290,527 B2 * | 10/2012 | Richardson | 455/522 |
| 8,320,872 B2 | 11/2012 | Snider | |
| 2002/0105417 A1 * | 8/2002 | Gillis et al. | 340/426 |
| 2007/0068240 A1 * | 3/2007 | Watabe | 73/146.5 |
| 2013/0198737 A1 * | 8/2013 | Ricci | 717/174 |
| 2013/0281140 A1 * | 10/2013 | Rubin et al. | 455/500 |

* cited by examiner

*Primary Examiner* — Ganiyu A Hanidu
(74) *Attorney, Agent, or Firm* — Frank A. MacKenzie; Brooks Kushman P.C.

(57) ABSTRACT

A vehicle system for detecting a jamming signal may include a receiver configured to receive a signal, the signal having signal properties. A controller may be in communication with the receiver configured to determine a jamming event probability based at least in part on the signal properties.

12 Claims, 4 Drawing Sheets

Duration
FIG. 2D

Duration
FIG. 2E

Duration
FIG. 2F

RF JAMMING DETECTION AND MITIGATION SYSTEM

BACKGROUND

Vehicles are equipped with various types of communication devices that perform and facilitate various functions. In particular, radio frequency (RF) is commonly employed to communicate between devices. For example, a remote keyless entry (RKE) system, which allows one to remotely lock and unlock automobile doors, employs RF communication. When a button is pushed on the remote key or keyfob, the remote transmits a coded signal to a receiver unit in the vehicle. When a valid RF signal is transmitted to the receiver unit, the remote entry controller locks or unlocks the vehicle doors.

However, there remains the prospect that a foreign RF pulse will interfere with the intended system's RF transmission or reception. For example, an RF transmission of greater amplitude may block an RF transmission of lesser amplitude if they are similar distances from the vehicle receiver. Similarly, an RF transmission of lower amplitude may also block an RF transmission of greater amplitude if the stronger transmission is much farther from the vehicle than the lower power transmitter. Consequently, there are multiple scenarios for which commands sent by valid transmitters for a vehicle system may not be received by corresponding receivers. For instance, an RKE receiver will not receive the key fob RF transmission causing the doors to remain unlocked unbeknownst to the vehicle occupants. The result being valuables within the vehicles are left unprotected against potential thieves. Likewise, a foreign RF pulse may interfere with other vehicle systems, e.g., a tire sensor RF transmission to the tire pressure monitoring system (TPMS) receiver, thus blocking TPMS messages. As such, there is a need to detect and report occurrences of RF jamming for, at least, the above reasons. These situations of RF jamming could be unintended or intended, but may have the same result regardless of the reason for the jamming.

SUMMARY

A vehicle system for detecting a jamming signal may include a receiver configured to receive a signal, the signal having signal properties. A controller may be in communication with the receiver configured to determine a jamming event probability based at least in part on the signal properties.

A method may include receiving, at a computing device, a signal from a receiver; determining at least one of a strength and a duration of the received signal; comparing the at least one of the strength and duration of the received signal with a predefined threshold associated therewith; and determining a jamming event probability based at least in part on the comparison of the strength and duration of the received signal with the respective predefined threshold.

A system for reporting a jamming event may include a database configured to maintain jamming event probability level data. A computing device may be in communication with the database configured to analyze cumulatively maintained jamming event probability level data received from a location and generate a report. A communication device may be in communication with the computing device and may be configured to send the report to a user.

DETAILED DESCRIPTION

Figure 1:
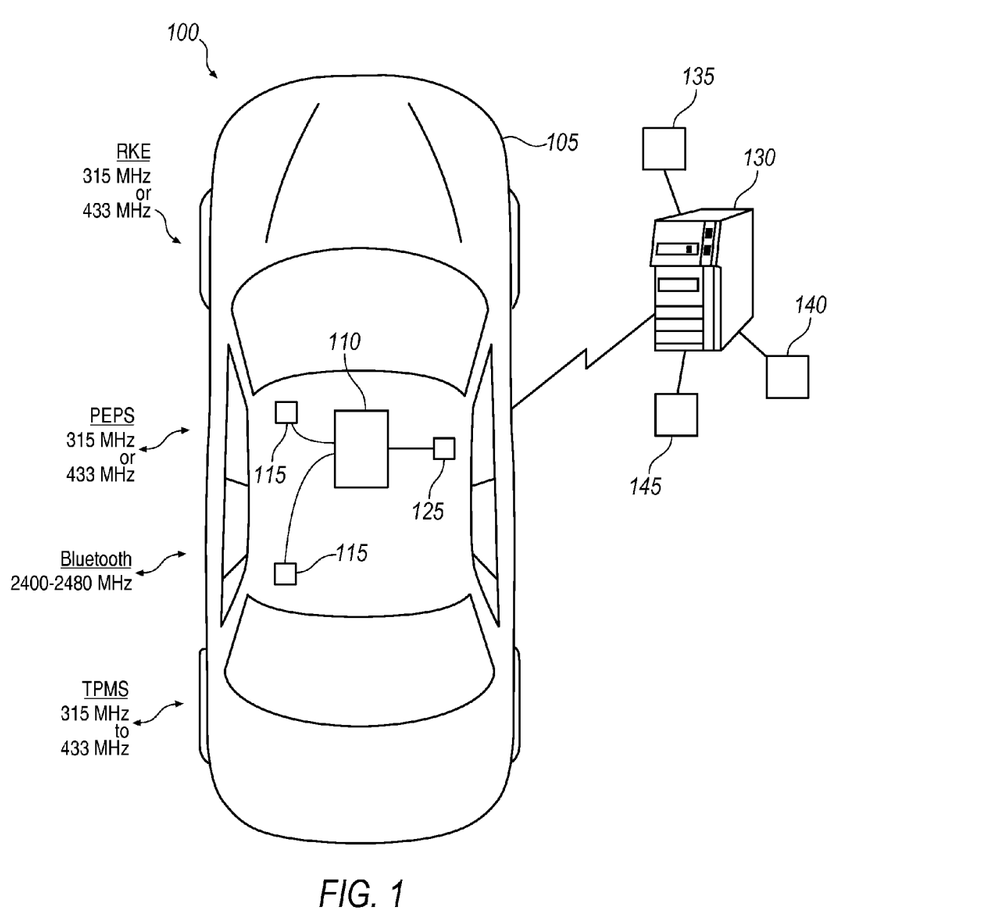
FIG. 1 is an exemplary system of a vehicle for detecting and reporting the occurrence of radio frequency jamming.

FIG. 1 illustrates an exemplary system 100 of a vehicle 105 for detecting and reporting the occurrence of radio frequency (RF) jamming. The vehicle 105 may be any type of vehicle such as a car, truck, bus, airplane, helicopter, or ship, for example. The system 100 may take many different forms and may include multiple and/or alternate components. While an exemplary system 100 is shown in FIG. 1, the exemplary components illustrated in system 100 are not intended to be limiting. Indeed, additional or alternative components and/or implements may be used.

The system 100 may detect occurrences of RF jamming and take measures to prevent a possible theft as well as record, mitigate, and alert of the occurrence. RF jamming may result from intentional blocking of a vehicle's RF communication devices (e.g., a thief using a special transmitter), or may result from unintentional interference from a radio tower or military base. For example, a 105 MHz radio tower may unintentionally emit spurious 315 MHz signals causing vehicle remote entry systems or garage door openers to not respond.

The system 100 may include a controller 110 and at least one receiver 115. The controller 110 and the receiver 115 may communicate with each other via an interface (not shown). The interfaces may include an input/output system configured to transmit and receive data from the respective components. The interface may be one-directional such that data may only be transmitted in one direction, i.e., from the controller 110 to the receiver 115, or vice versa. Alternatively, the interface may be bi-directional, allowing both receiving and transmitting data between the components.

The receiver 115 may be part of a system, such as a remote keyless entry (RKE) system or a passive keyless entry/passive start (PEPS) system. These systems are merely exemplary, and the disclosure is not limited in any way to the RKE or PEPS system. As such, one skilled in the art will understand that the disclosure applies to any RF systems on the vehicle. The receiver 115 may be configured to receive a signal from a corresponding counterpart device, such as a key fob or a tire sensor. For example, the controller 110 in a PEPS system may transmit a low frequency (LF) challenge (typically 125 KHz) at a predefined interval (e.g., 200-800 ms) in search for an ultra-high frequency (UHF) response from a transmitting key fob on 315 MHz or 433.92 MHz. The receiver 115 may be located in the vehicle 105, as shown in FIG. 1. Additionally or alternatively, several external receivers 115 may be included around the vehicle 105. For example, some systems may have two exterior 315 MHz receivers 115 with one dedicated to PEPS at a higher bit rate (ex., 10-20 kbps) and then one tire sensor or RKE receiver working at a lower bit rate (ex., 2-10 kbps).

The controller 110 may receive input from at least one receiver 115. Upon an identification of the presence of a properly encrypted signal—e.g., with proper protocol format and message duration—sent by a transmitter (such as a key fob or tire pressure sensors, merely as examples), the controller 110 may initiate a challenge-accept sequence with the transmitter. The sequence may include the receiver 115 listening for a response from the transmitter including an identification code associating that transmitter to the subject vehicle. Upon receipt of the correct identification code, the controller 110 may then perform the command, such as lock or unlock of the vehicle 105 doors.

The controller 110 may include any computing device configured to execute computer-readable instructions. For example, the controller 110 may include a processor (not shown) and a database 125. The memory may be comprised of a flash memory, RAM, EPROM, EEPROM, hard disk drive, or any other memory type or combination thereof. Alternatively, the database 125 may be incorporated into the processor. In yet another embodiment, there may be multiple control units in communication with one another, each containing a processor and database 125.

In general, computing systems and/or devices such as the controller 110 may employ any number of computer operating systems, including, but not limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating system distributed by Apple, Inc. of Cupertino, Calif., the Blackberry OS distributed by Research in Motion of Waterloo, Canada, and the Android operating system developed by the Open Handset Alliance. It will be apparent to those skilled in the art from the disclosure that the precise hardware and software of the controller 110 can be any combination sufficient to carry out the functions of the embodiments discussed herein.

Still referring to FIG. 1, the controller 110 may communicate with a remote server 130 via a communication device (not shown), such as a vehicle telematics device or any device that communicates with entities outside the vehicle 105. The communication device may communicate via any wireless communication network such as high bandwidth GPRS/1XRIT channel, RF transmission, a wide area network (WAN) or local area network (LAN), WiFi, Satellite, or a cloud-based communication, for example. In an exemplary implementation, the controller 110 and the remote server 130 may participate in a computing network (e.g., cloud-computing), in which case the remote server 130 may identify the controller 110 by the vehicle identification number (VIN). Additionally or alternatively, the controller 110 and remote server 130 may be in communication over a mobile communication network, such as GSM or CDMA. The remote server 130 may identify the vehicle 105 by the unique device identifier (UDID) or the international mobile station equipment identifier (IMEI), which may be transmitted via Bluetooth® wireless, for example, to the controller 110. Additionally or alternatively, the communication device (e.g., vehicle telematics device) may include a global positioning system (GPS) or any other system that determines vehicle location.

The remote server 130 may include a computing device 135 or processor, a remote database 140 for storing vehicle 105 information, and a communication device 145 for transmitting and receiving information via the wireless network.

A foreign RF signal—whether intentional or unintentional—may be directed at the vehicle 105 and interfere with the receivers' 115 ability to listen for system commands. The receivers 115 may be configured to receive a signal, the signals of which have signal properties—such as signal strength and duration, protocol format, message structure, and transmitter source ID. During normal operation of a system (e.g., an RKE or PEPS system), the receiver 115 may look for either Amplitude Shift Keyed (ASK) RF activity or Frequency Shift Keyed (FSK) RF activity, as well as frequency modulation (FM) and other RF encoding methods. For example, a receiver 115 for an RKE system may search for a 315 MHz ASK pulse transmitted from a key fob (not shown), with a signal strength set at original equipment manufacturer (OEM) design levels. That is, the key fob may radiate bits grouped in message blocks into the air by an RF transmitter that generates a 315 MHz carrier for a specified duration to correspond to a unique message in response to a unique key or key fob button command. As is common with such RKE systems, the transmitter may send 3 to 4 redundant copies of this unique message (e.g., 10-50 ms per message transmission) with dead space between the messages (e.g., 50 ms) resulting in a total transmission time of 400-500 ms for the group of transmissions that result from a single button command. The particular bits in the message block from the key fob contain the command to lock or unlock the vehicle 105, for example. The message block may be received by, for example, a superheterodyne receiver 115, in which case an Envelop Detector circuit converts the 315 MHz carrier amplitude shifting into a digital stream of 1 or 0 bits. In an exemplary illustration, the 315 MHz carrier is activated to generate a logic 1 bit and the absence of the carrier is considered a logic 0 bit (e.g., essentially an on or off sequence to convey information).

Figure 2A:
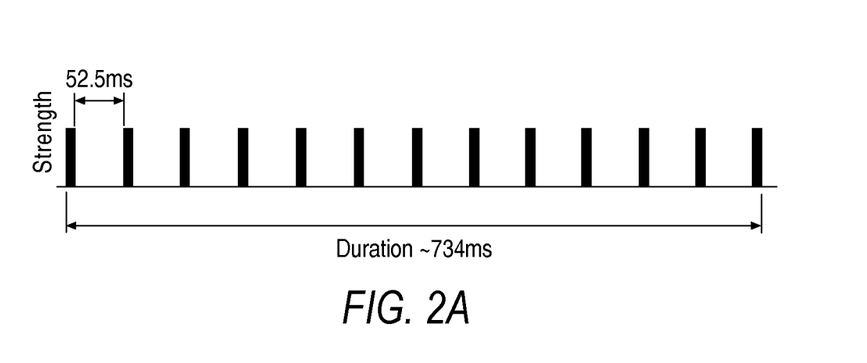
FIG. 2a is an exemplary depiction of a radio frequency signal for a tire pressure monitoring system.
Figure 2B:
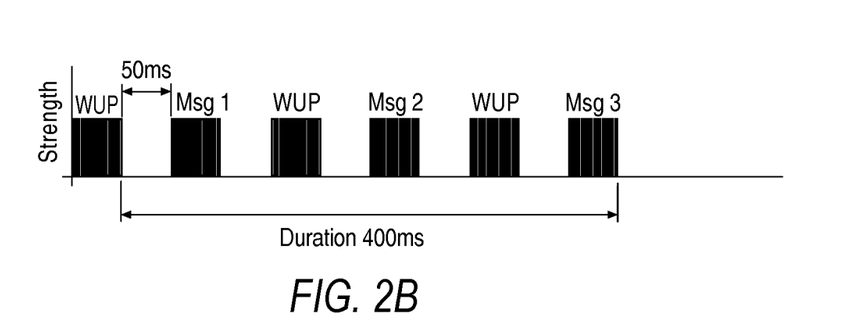
FIG. 2b is an exemplary depiction of a radio frequency signal for a typical remote keyless entry system.
Figure 2C:
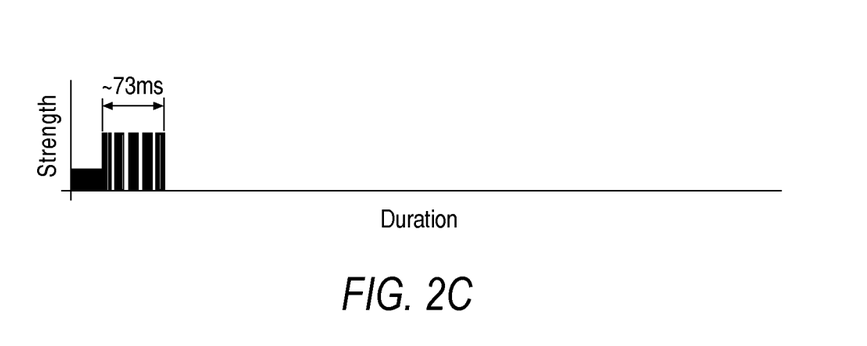
FIG. 2c is an exemplary depiction of a radio frequency signal for a passive entry, passive start system.

FIGS. 2a-2c demonstrate an exemplary illustration representing a message grouping of typical TPMS, RKE, or PEPS protocols. To allow the various RF systems on the vehicle 105 to co-exist without interference during normal operation, the system transmitters (not shown) located in the key fob or tire pressure sensors, for example, may radiate redundant message pulses. This is particularly important for systems operating or active on the same frequency, such as 315 MHz or 433 MHz for the TPMS, RKE, and PEPS systems. For example, the TPMS illustrated in FIG. 2a may transmit pulses of 52 μs in duration forming 13 redundant messages of about 8 ms in length over a 734 ms duration (with ~52 ms quiet phases) so that if, by chance, the message collides with a key fob RF transmission, several other TPMS pulses may still be heard during the quiet spaces in the key fob messages. Conversely, as illustrated in FIG. 2b, the key fob for an RKE protocol may transmit pulses of 238 μs in duration, forming three redundant messages of about 50 ms in length (and 3 wake-up messages that include no information) to mitigate collisions with other key fobs (e.g., key fobs of other vehicles) or TPMS messages. Additionally, as shown in FIG. 2c, the PEPS system may be active on 315 MHz with pulses of 104 μs in duration forming a single message of about 13 ms in length over a ~73 ms duration.

Figure 2D:
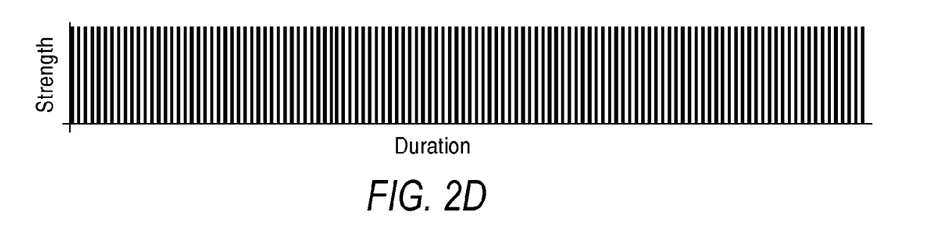
FIG. 2d is an exemplary depiction of a continuous radio frequency jamming signal.
Figure 2E:
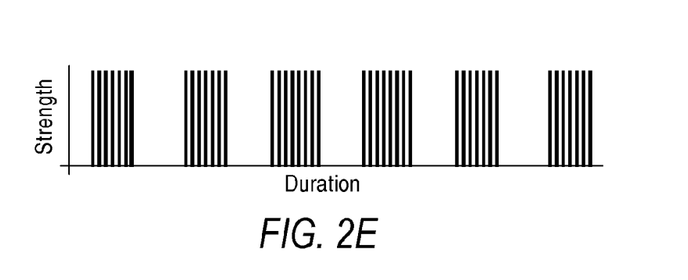
FIG. 2e is an exemplary depiction of a radio frequency jamming signal of proper protocol and message structure, but invalid identification.
Figure 2F:
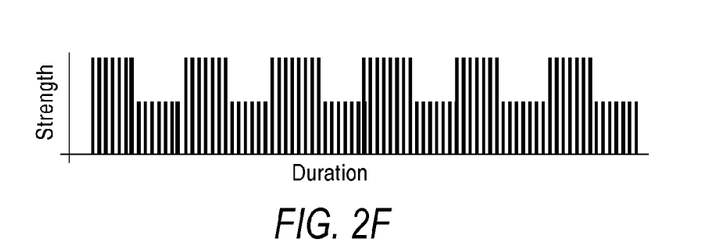
FIG. 2f is an exemplary depiction of a radio frequency jamming signal of proper protocol and message structure, but invalid identification with no quiet phases.

However, in referring to FIGS. 2d, 2e, and 2f, problems with RF jamming may occur when a special transmitter (e.g., an invalid or foreign transmitter) of sufficient signal strength and/or signal duration is placed in a location that dominates a valid transmitter as heard from the target receiver. That is to say, the special transmitter emits RF signals sufficient to interfere with the primary transmitter signal and disrupt the intended system command.

As shown in FIG. 2b, an RF jamming signal may include continuous ASK pulses of signal strength on the same frequency greater than OEM design levels. For example, the typical RKE key fob may transmit three ASK pulses on 315 MHz or 433.92 MHz to a receiver 115 on the vehicle 105 over a 450 ms duration with 50 ms intervals of quiet phases. However, a continuous ASK pulse of greater received signal strength indication (RSSI) and/or duration (e.g., greater than 450 ms) may sufficiently jam the receiver 115 as to make the RKE system non-responsive. For instance, a received signal of RSSI gain and duration greater than that set at design level, e.g., as determined by the OEM, may sufficiently interfere with the target receiver 115. Likewise, a received signal of duration greater than the design level, e.g., greater than 450 ms for an RKE system, but of low signal strength may sufficiently interfere with the target receiver 115 if the jamming signal is placed in a dominant location (e.g., in an intermediary point between the key fob and target receiver 115). In other words, the jamming signal will block the key fob command and prevent the vehicle 105 doors from locking or unlocking.

To combat RF jamming in FIG. 2d, the controller 110 may be configured with a predefined threshold associated with each signal property and/or RF system. The signal properties may include signal strength and duration. Additionally or alternatively, the signal property may include intervals of quiet and active phases. The predefined threshold may include a signal strength and/or duration set at a design level, e.g., as determined by the OEM. Additionally or alternatively, the predefined threshold may include a sequence of received RF signals. For example, the predefined threshold may be continuous ASK pulses, as shown in FIG. 2d. The predefined threshold may associate with a particular RF system. For example, the predefined threshold for signal strength and duration of an RKE system may be different than that of a PEPS system, although both use a carrier on the same frequency. The controller 110 may then compare the received signal properties and the predefined threshold to determine a jamming event probability. That is, the controller 110 may determine the probability a jamming signal is currently directed at the vehicle 105. For example, if the receiver 115 receives an RSSI and signal duration greater than the predefined threshold (e.g., set at the standard OEM level), the controller 110 may determine the jamming event probability is high.

On the other hand, if only one signal property is above the threshold, the jamming event probability may be considered moderate. For example, if the received signal RSSI gain is sufficient to be considered valid RF activity from other vehicle fobs but it is detected to run continuously past the threshold duration (e.g., past ~450 ms for an RKE system), the controller 110 may determine there is a moderate probability of RF jamming. Additionally, a signal of valid duration but of high gain RSSI may be sufficient to jam a system command. For instance, a jamming signal of ~60-70 ms may jam a single PEPS UHF transmission if the RSSI gain is sufficiently strong insomuch as a key fob in the PEPS system will only respond with a UHF response in the event it hears/receives the LF challenge and is within range (e.g., 2-4 meters). Furthermore, a jamming event probability may be classified as low if a received signal of RSSI gain and signal duration does not exceed the respective predefined threshold in a single event. However, such received signal may be classified as moderate jamming event probability as a function of the repetition of events (e.g., the received signal of foreign origin is repetitively detected by the receiver 115).

Additionally or alternatively, the controller 110 may be configured to recognize a moderate jamming event probability in response to signal threshold durations. As merely exemplary, and in no manner meant to be limiting, the threshold durations may include 700 ms, 450 ms, and 100 ms. A signal over 700 ms may jam the TPMS, RKE, and PEPS systems. A signal over 450 ms may jam the RKE and PEPS system. Further, a signal over 100 ms may jam the PEPS system. Thus, upon receiving any of the aforementioned predefined signal thresholds, the controller 110 may be on alert of a potential jamming event and generate a moderate jamming event probability. Accordingly, the jamming event probability may be unrelated to the strength of the received signal RSSI. For instance, a signal of duration greater than 700 ms may be of low strength for the RKE system since key fobs can be tens of meters from the vehicle, but may need to be of higher signal strength for the TPMS system since the tire sensors are fixed to the vehicle tires. Nevertheless, both received signals may generate a moderate jamming event probability.

FIGS. 2e and 2f disclose a more sophisticated technique of RF jamming of vehicle 105 communication systems. The technique illustrated in FIG. 2c includes an RF jamming signal constructed with valid protocol and message structure, but an invalid identification which is transmitted at sufficient signal strength to corrupt the valid signal for the vehicle's 105 RF communications system (e.g., RKE, TPMS, PEPS, etc.). The controller 110 may recognize the foreign signal as a jamming signal if RSSI gain (e.g., signal strength) greater than reasonably expected (e.g., the predefined threshold set at the OEM design level) is detected for a signal composing a message that is the proper protocol format and message duration, but with an invalid identification. For example, the received signal overlaps a valid RF transmission (e.g., from the vehicle's key fob or tire sensor) with the same active and quiet intervals. Such a received signal detected by the controller 110 may be classified as a high jamming event probability. Conversely, a received signal of relatively constant RSSI gain sufficient to be considered valid RF activity with proper protocol and message structure, but with continuous RF activity during the quiet or 0 logic phases of the message, may be considered a moderate jamming event probability. In other words, the signal strength falls below the predefined threshold but the signal duration exceeds the predefined threshold.

In the event RF jamming signals are detected, the vehicle system may record the event in database 125 along with a stamp with critical data, e.g., jamming event probability level data, to be used for tracking, record keeping, and correlated purposes. Jamming event probability level data may include the date, time, and location the jamming event was detected, the strength or RSSI value detected from the receiver, the jamming event probability (e.g., high, moderate, or low probability), and the vehicle heading or route. Accordingly, it may be easier to detect and diagnose an RF transmission as a high or moderate jamming event probability with data compiled at a GPS location.

Additionally or alternatively, the jamming event probability level data may be transmitted to the remote server 130 and maintained in the remote database 140. The remote database 140 may store the jamming probability event data and associate it with the vehicle identification number (VIN) and location of transmission. The remote server 130 may create a composite database indicating regional hot spots after multiple jamming probability events have been detected at the location. Localizing regional hot spots may aid in determining the RF jamming event probability by recognizing areas, days, or times of day that exhibit higher occurrence rates of jamming events. For example, the jamming event probability may be higher in an area with multiple reports of RF jamming signals. The remote server 130 may recognize the jamming event probability level data was transmitted from a hot spot and send an alert to the vehicle or driver. For instance, the remote server 130 may trigger the horn to beep, the headlights to flash, or the alarm to sound. Moreover, a vehicle owner or operator may be notified via a mobile communication device such as a phone, handheld computing device, smartphone, or the like.

Figure 3:
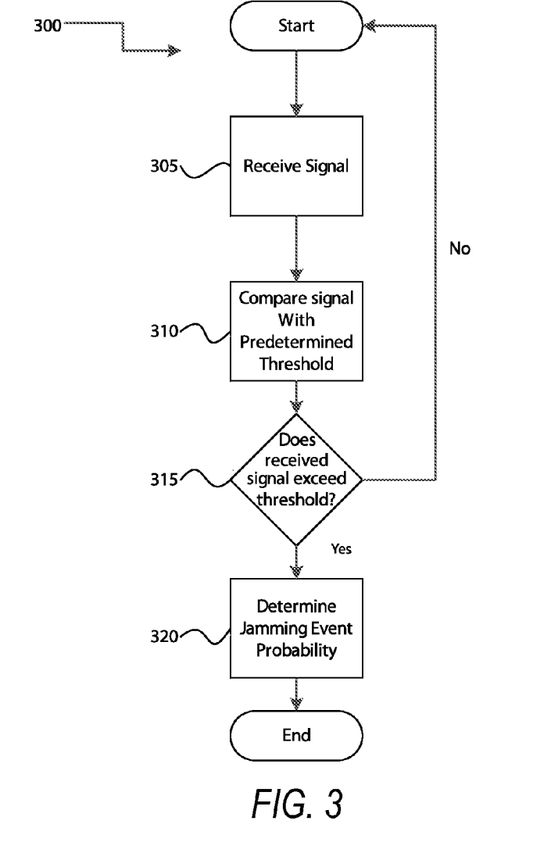
FIG. 3 is an exemplary process for determining a jamming event probability.

FIG. 3 represents an exemplary process 300 for determining a jamming event probability. The process begins at block 305. A block 305, the receiver 115 receives a signal having signal properties. The signal properties may include signal strength and duration, signal repetition, protocol format, and message structure, for example.

At block 310, the receiver 115 communicates the received signal to the controller 110 in which the controller 110 compares the signal properties with predefined thresholds. The predefined threshold may associate with each signal property and may depend on which receiver 115 is responding to the transmission. For example, with respect to 315 MHz UHF RF transmission protocols, the TPMS predefined threshold for signal strength and duration may be a level reasonably expected by the OEM design (e.g., a threshold duration of 734 ms). Additionally or alternatively, the predefined threshold may be classified by signal format and structure. For example, a received signal of continuous ASK pulses may be a predefined threshold. Likewise, a received signal with an invalid identification, but proper protocol format and message duration, may be a predefined threshold. The controller 110 uses the received signal properties, such as signal strength (RSSI) and duration, and compares the received signal with the predefined threshold.

At block 315, the controller 110 may determine if the signal properties exceed the predefined threshold. If the signal properties appear normal or fall below the predefined threshold, the controller 110 runs its normal operations and the process reverts back to block 305. On the other hand, if at least one of the signal properties exceeds the predefined threshold, the process proceeds to block 320.

At block 320, the controller 110 determines the jamming event probability, which is based at least in part on comparing the signal strength and signal duration with the predefined thresholds associated with each signal property. For example, a received signal of RSSI gain greater than the predefined threshold strength set at the OEM design level running for a continuous duration greater than the predefined threshold duration (e.g., 450 ms for RKE, 734 ms for TPMS) will produce a high jamming event probability. Thus, a high RSSI gain and long signal duration may generate a high jamming event probability. Conversely, an RSSI gain sufficient to be considered valid RF activity, but for a continuous duration which dominates the valid RF signal, may be considered a moderate jamming event probability.

Figure 4:
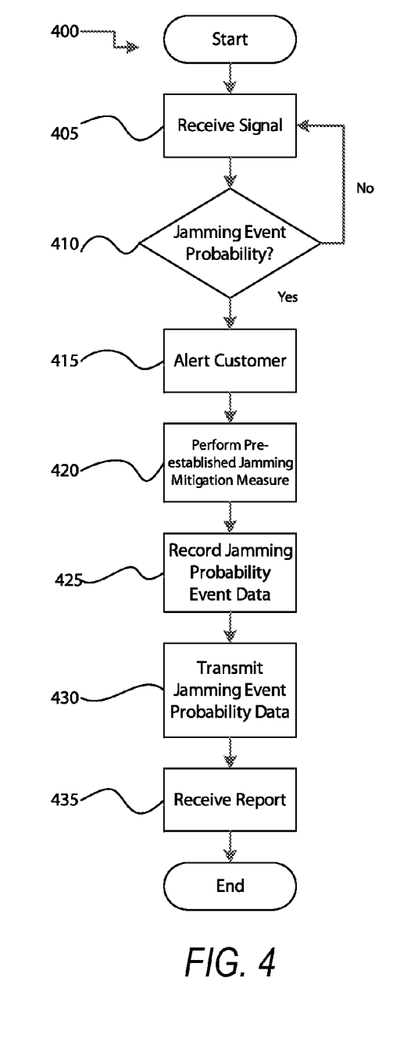
FIG. 4 is an exemplary process for detecting, mitigating, and reporting a jamming event probability.

FIG. 4 is an exemplary process 400 for detecting, mitigating, and reporting a jamming event probability. The process begins at block 405, in which the controller 110 receives a signal having signal properties from at least one receiver 115. As mentioned previously, the signal properties may include signal strength, duration, message structure, protocol format, and transmitter ID. Once the controller 110 receives the signal, the process 400 proceeds to block 410.

At block 410, the controller 110 may determine a jamming event probability associated with a received signal. In some exemplary approaches, the controller 110 may initially determine the signal strength and duration of the received signal. The controller 110 may then compare the received signal properties (e.g., signal strength and duration) with a predefined threshold associated with each signal property. For example, the controller 110 may compare the RSSI gain of the received signal with a predefined threshold set at the OEM design level for the particular system and receiver 115. A jamming event probability may be based at least in part on the comparison of the strength and duration of the received signal with the respective predefined threshold. For example, if the received signal is a continuous repetitive jamming signal with an RSSI and duration greater than the respective predefined threshold, the received signal may be classified as a high jamming event probability. Additionally or alternatively, a received signal constructed with a valid protocol and message structure, but invalid identification encryption (e.g., bit structure and pulse spacing are correct), may generate a high jamming event probability if the RSSI gain is greater than the predefined threshold. If, for example, the signal properties of the received signal do not exceed the predefined threshold, the controller 110 may determine no action is necessary and the process 400 may return to block 405. However, after comparing the received signal with the predefined thresholds, the controller 110 generates a jamming event probability of moderate or high, and the process proceeds to block 415.

At block 415, controller 110 may provide real-time alert messages in response to the jamming event probability being one of moderate or high. The alert response may be predefined by the vehicle 105 OEM and/or specifically customized to the vehicle user's preference via a configuration set-up method maintained in the database 125. For example, the alert response may involve a vehicle 105 based indicator in which the door light-emitting diode (LED) lights flash or the horn begins to chirp. Additionally or alternatively, an alert response may be sent to a paired phone or mobile connectivity device (e.g., a tablet computer) via Bluetooth® wireless connection, SMS Message, WiFi, or Email. Likewise, the controller 110 may communicate with a human-machine interface (HMI) to display an alert message warning the vehicle 105 occupants of the risk of potential RF Jamming and providing a recommended course of action, such as locking the doors by interior switch. Furthermore, an alert may be transmitted to the vehicle 105 key fob and displayed in the form of a blinking LED or via text on the key fob display. Additionally or alternatively, an alert may be transmitted over a dedicated short-range communications (DSRC) vehicle-to-vehicle or vehicle-to-infrastructure connection along with location, signal properties, and the date and time of occurrence as a courtesy to other vehicles and authorities. Further, as part of a customer preference set-up for jamming detection, the customer may elect to allow the vehicle controller 110 to arm the security alarm whenever a door ajar event is detected within a specified time frame around an RF jamming event detection if the vehicle is not locked within a specified period of the event (e.g. 3-5 seconds). If the jamming proved successful in blocking the lock transmission, this arming method may still allow some protection by sounding the alarm when the unlocked door is opened.

At block 420, the controller 110 may implement a pre-established jamming mitigation measure maintained in the database 125. For example, if a jamming event probability is detected along with signs of driver departure (e.g., engine shut-off, door ajar, no PEPs key fob detected within the cabin) and a door lock event was not detected, the vehicle could perform an automatic lock event. Additionally or alternatively, detection of departure may trigger the vehicle 105 security alarm system to arm so that it would trigger in the case of a door ajar event and/or triggering motion or inclination (e.g., tilt) sensors. Further, the security alarm system may trigger in the event the tires are detected to be moving (e.g., via TPMS or anti-lock brake sensor transmission) while the engine is off, for example to detect illegal towing of the unlocked vehicle.

At block 425, the controller 110 may record jamming event probability level data in the database 125. For example, the jamming event probability level data may include the date and time of detecting the potential RF jamming signal and the received signal strength or RSSI value from the receiver 115. Recording the RSSI with OEM and vehicle model year may help build a national database with normalized measurements from different OEMs. Additionally or alternatively, the jamming event probability level data may include GPS location and elevation, vehicle heading (e.g., course), the alert response and mitigation measure triggered, and the method used to notify the customer. Once the controller 110 has recorded the jamming event probability (via the database 125), the process 400 may proceed to block 430.

At block 430, the controller 110, via the communications device (not shown), may transmit the jamming event probability to the remote server 130. The remote server 130 may maintain jamming event probability level data received by all vehicles 105 in communication with the server 130 via a remote database 140, for example a cloud-based database. Creating a composite remote database 140 of jamming event probability level data may indicate regional hot spots in which RF jamming signals are frequently reported. For example, a high aggregate of jamming event probability level data received in a particular location may create a regional hot spot. Such information may be of interest to authorities in order to correct the situation, as well as OEMs with respect to investigating field concerns and vehicle warranties. Additionally or alternatively, at block 435 the computing device 135 may analyze the jamming event probability level data and send a report to the vehicle 105, for example, via Email, text message, or display on the vehicle's HMI display.

Computing devices, such as the vehicle control modules, sensors, interfaces, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer-readable media associated therewith (e.g., disks, memories, etc.). A computer program product may comprise such instructions stored on computer-readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc. may be interchangeable.

What is claimed as new and desired to be protected by Letters Patent of the United States is:

1. A vehicle system for detecting a jamming signal, comprising:
   a receiver configured to receive a radio frequency (RF) signal; and
   a controller in communication with the receiver configured to generate data indicating high probability that the RF signal defines a jamming event able to interfere with reception of other RF signals at the receiver in response to signal strength and signal duration of the RF signal exceeding respective predefined thresholds, and
   generate data indicating moderate probability that the RF signal defines the jamming event in response to the signal strength or signal duration exceeding the respective predefined thresholds.

2. The system of claim 1, further comprising a database in communication with the controller.

3. The system of claim 2, wherein the controller is further configured to provide an alert in response to the data indicating high probability or moderate probability.

4. The system of claim 2, wherein the database is configured to maintain a pre-established jamming mitigation measure and wherein the controller is configured to activate the pre-established jamming mitigation measure.

5. The system of claim 2, wherein the database is configured to maintain jamming event probability data.

6. The system of claim 5, wherein the controller is configured to transmit the jamming event probability data.

7. A method comprising:
   receiving a radio frequency (RF) signal; and
   generating, by a computer,
      data indicating high probability that the RF signal defines a jamming event able to interfere with reception of other RF signal in response to a strength and duration of the RF signal exceeding respective predefined thresholds , and
   data indicating moderate probability that the RF signal defines the jamming event in response to the strength or duration exceeding the respective predefined thresholds.

8. The method of claim 7, further comprising sending an alert message in response to the data indicating high or moderate probability.

9. The method of claim 7, further comprising activating a pre-established jamming mitigation measure.

10. The method of claim 7, further comprising maintaining jamming event probability data recorded in response to the data indicating high or moderate probability.

11. The method of claim 10, further comprising transmitting the jamming event probability data to a remote server.

12. The method of claim 11, further comprising receiving a report from the remote server describing the jamming event probability data.

* * * * *